US008940397B2

(12) United States Patent
Mallesha et al.

(10) Patent No.: US 8,940,397 B2
(45) Date of Patent: Jan. 27, 2015

(54) WEATHERABLE AND ABRASION RESISTANT COATING SYSTEMS FOR POLYMERIC SUBSTRATES

(75) Inventors: Honnaiah Mallesha, Mandya District (IN); Anantharaman Dhanabalan, Bangalore (IN); Robert F. Hayes, Mechanicville, NY (US); Narayana Padmanabha Iyer, Bangalore (IN); Marc Schaepkens, Troy, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 457 days.

(21) Appl. No.: 13/036,348

(22) Filed: Feb. 28, 2011

(65) Prior Publication Data

US 2012/0219803 A1  Aug. 30, 2012

(51) Int. Cl.
| | | |
|---|---|---|
| *C08K 3/22* | (2006.01) | |
| *C09D 7/12* | (2006.01) | |
| *C09D 169/00* | (2006.01) | |
| *C08L 75/08* | (2006.01) | |
| *C09D 175/08* | (2006.01) | |
| *C08G 18/10* | (2006.01) | |
| *C08G 18/44* | (2006.01) | |
| *C08J 7/04* | (2006.01) | |
| *C09D 175/06* | (2006.01) | |
| *B05D 1/00* | (2006.01) | |
| *B05D 5/00* | (2006.01) | |
| *B05D 7/02* | (2006.01) | |
| *B05D 7/00* | (2006.01) | |
| *C08L 75/04* | (2006.01) | |
| *C08K 3/00* | (2006.01) | |
| *C08K 3/20* | (2006.01) | |

(52) U.S. Cl.
CPC ...... *C09D 169/00* (2013.01); *C08K 2003/2241* (2013.01); *C08K 2003/2244* (2013.01); *C08K 2003/2296* (2013.01); *C08L 75/08* (2013.01); *C09D 175/08* (2013.01); *B05D 1/62* (2013.01); *B05D 5/00* (2013.01); *B05D 7/02* (2013.01); *B05D 7/52* (2013.01); *C08G 18/10* (2013.01); *C08G 18/44* (2013.01); *C08J 7/042* (2013.01); *C08J 2469/00* (2013.01); *C08J 2475/04* (2013.01); *C08K 3/22* (2013.01); *C08K 2003/2213* (2013.01); *C08L 75/04* (2013.01); *C09D 175/06* (2013.01); *C09D 7/1216* (2013.01); *C08K 3/0041* (2013.01); *C08K 3/20* (2013.01)
USPC .......... 428/412; 524/403; 524/413; 524/432; 528/370; 427/385.5

(58) Field of Classification Search
CPC ............ C08K 3/22; C08K 2003/2213; C08K 2003/2241; C08K 2003/2244; C08K 2003/2296; C08L 75/08
USPC ............................ 528/370; 524/403, 413, 432
See application file for complete search history.

(56) References Cited

U.S. PATENT DOCUMENTS

| | | | |
|---|---|---|---|
| 3,986,997 | A | 10/1976 | Clark |
| 4,177,315 | A | 12/1979 | Ubersax |
| 4,239,798 | A | 12/1980 | Schroeter et al. |
| 4,275,118 | A | 6/1981 | Baney et al. |
| 4,390,373 | A | 6/1983 | White et al. |
| 4,405,676 | A | 9/1983 | Pohl |
| 4,405,679 | A | 9/1983 | Fujioka et al. |
| 4,442,168 | A | 4/1984 | White et al. |
| 4,476,281 | A | 10/1984 | Vaughn, Jr. |
| 4,500,669 | A | 2/1985 | Ashlock et al. |
| 4,571,365 | A | 2/1986 | Ashlock et al. |
| 4,799,963 | A | 1/1989 | Basil et al. |
| 5,035,745 | A | 7/1991 | Lin et al. |
| 5,156,882 | A | 10/1992 | Rzad et al. |
| 5,199,979 | A | 4/1993 | Lin et al. |
| 5,316,854 | A | 5/1994 | Lin et al. |
| 5,344,712 | A | 9/1994 | Basil et al. |
| 5,349,002 | A | 9/1994 | Patel |
| 5,385,964 | A | 1/1995 | Basil et al. |
| 5,712,342 | A * | 1/1998 | Kim et al. ............... 524/591 |
| 5,785,892 | A | 7/1998 | Nishida et al. |
| 6,025,025 | A | 2/2000 | Bartrug et al. |
| 6,048,910 | A | 4/2000 | Furuya et al. |
| 6,180,248 | B1 | 1/2001 | Basil et al. |
| 6,197,101 | B1 | 3/2001 | Matsumura et al. |
| 6,264,859 | B1 | 7/2001 | Basil et al. |
| 6,355,189 | B1 | 3/2002 | Basil et al. |

(Continued)

FOREIGN PATENT DOCUMENTS

| | | |
|---|---|---|
| EP | 0170295 | 5/1990 |
| EP | 1070750 | 1/2008 |

(Continued)

OTHER PUBLICATIONS

Machine translation of JP 2006/206774 A, Aug. 10, 2006.*
Akimoto, M., et al., "Coating agent compositions for motor vehicle", Database WPI, Thomson Scientific, London, GB; AN 2006-544984, XP002676375, and JP 2006-206774 A (Nippon Polyurethane Kogyo KK) Aug. 10, 2006) Abstract.

* cited by examiner

*Primary Examiner* — Vickey Nerangis
(74) *Attorney, Agent, or Firm* — Hoffman Warnick LLC (57) ABSTRACT

Disclosed herein is a primer composition comprising an inorganic UV absorbing agent and a polymer selected from (i) a copolycarbonate, and (ii) a polyurethane obtained by reaction of a polyisocyanate and a copolycarbonate diol. Also disclosed is a coated article comprising a polymeric substrate, a primer layer disposed on at least one surface of said substrate, and an abrasion-resistant layer disposed on said primer layer, where the primer layer is made from the primer composition of the invention.

20 Claims, 2 Drawing Sheets

(56) References Cited

U.S. PATENT DOCUMENTS

| | | |
|---|---|---|
| 6,497,964 B1 | 12/2002 | Matsumura et al. |
| 6,586,502 B2 | 7/2003 | Wallace et al. |
| 6,627,724 B2 * | 9/2003 | Meijs et al. ............... 528/26 |
| 6,676,740 B2 | 1/2004 | Matsumura et al. |
| 7,157,146 B2 * | 1/2007 | Higuchi et al. ............ 428/447 |
| 7,226,985 B2 * | 6/2007 | Hale et al. ............... 528/272 |
| 7,351,477 B2 | 4/2008 | Yamaya et al. |
| 2002/0010273 A1 | 1/2002 | Matsumura et al. |
| 2002/0022682 A1 | 2/2002 | Wallace et al. |
| 2003/0060593 A1* | 3/2003 | Funakoshi et al. ......... 528/196 |
| 2006/0052486 A1* | 3/2006 | Fujita ..................... 523/212 |
| 2006/0204746 A1 | 9/2006 | Li et al. |
| 2006/0235178 A1 | 10/2006 | Wang et al. |
| 2007/0212548 A1 | 9/2007 | Lefaux et al. |
| 2008/0057316 A1 | 3/2008 | Landou et al. |
| 2008/0268260 A1 | 10/2008 | Varaprasad et al. |
| 2009/0232989 A1* | 9/2009 | Tojo ....................... 427/256 |

FOREIGN PATENT DOCUMENTS

| | | |
|---|---|---|
| GB | 2350838 A | 12/2000 |
| JP | 53-111336 | 9/1978 |
| JP | 2006206774 A * | 8/2006 |
| JP | WO2011/021500 A1 | 2/2011 |
| WO | WO2004/112482 A2 | 12/2004 |

Figure 3. (i). Coating example-2 and (ii) Coating example-1

Figure 4

WEATHERABLE AND ABRASION RESISTANT COATING SYSTEMS FOR POLYMERIC SUBSTRATES

BACKGROUND OF THE INVENTION

The present invention relates to weatherable and abrasion resistant coating systems for polymeric substrates.

Polymeric materials, such as polycarbonate, are promising alternatives to glass for use as structural material in a variety of applications, including automotive, transportation and architectural glazing applications, where increased design freedom, weight savings, and improved safety features are in high demand. Plain polycarbonate substrates, however, are limited by their lack of abrasion, chemical, UV and weather resistance, and therefore need to be protected with optically transparent coatings that alleviate above limitations in the aforementioned applications.

To impart abrasion resistance to the polymeric materials, polycarbonate substrates are in general coated with thermally curable silicone hardcoat. The poor weatherability of polycarbonate, on the other hand, is addressed with addition of organic or inorganic UV-absorbing materials in the silicone hardcoat layer. However, incorporation of UV absorbers, especially organic based, in the thermal curable silicone layer, often leads to inferior abrasion resistance performance.

One approach to address the limited abrasion resistance performance associated with the use of organic UV-absorbing materials is to use inorganic UV-absorbing materials at least partially in lieu of organic absorbing materials. The expected benefit is to avoid the addition of large amount of organics in the silicone hardcoat, thereby keeping abrasion resistance characteristics intact. In addition, given the photo and oxidative stability of inorganic UV-absorbing materials compared with organic UV absorbers, the use of inorganic UV-absorbing materials can potentially help to achieve weatherability for extended period of time.

However, it is technically challenging to incorporate inorganic UV-absorbing materials in the form of colloidal dispersion into an organic based coating composition, either with or without the presence of colloidal silica in the coating composition. The challenges relate to the ability to obtain long-term stable inorganic UV absorber dispersions, the ability to inhibit the agglomeration of colloidal particles of the inorganic UV absorbers, and the ability to maximize the loading of inorganic UV absorbers in order to maintain abrasion resistance characteristics without adversely affecting the film uniformity.

Another approach to address the limited abrasion resistance of thermal curable silicone hardcoat, is to deposit an abrasion resistant coating such as a hydrogenated silicon oxycarbide layer on top of commercially available thermally cured hardcoat systems by plasma techniques. However, although the outdoor weatherability for such a system might be slightly improved compared with commercially available coating systems, the hydrogenated silicon oxycarbide layer-containing system is still not able to meet the 10-15 year durability requirements that the market demands. Further, such a coating system is a relatively complex multilayer structure that is difficult to manufacture. Due to the costs of the raw material and the costs of processing and integration of multiple layers, the polycarbonate substrate coated with a hydrogenated silicon oxycarbide comprising system can be much more expensive than conventional glass.

In order to address the manufacturing complexity of hydrogenated silicon oxycarbide comprising systems, improvements have been disclosed for example in patent application publication US 20060204746, where an inorganic weatherable film layer is adhered to the polymeric substrate and a plasma deposited hydrogenated silicon oxycarbide abrasion resistant layer is directly deposited on the inorganic weatherable film layer. However, to insure adhesion between the weatherable film and the substrate, as well as the weatherable film and the abrasion resistant layer, one or more adhesion promoting interlayers are typically required, thus complicating this manufacturing process as well.

Hence, there is a continuing need for a protective coating method and composition for polymeric substrates that is effective to provide AS-2 type abrasion resistance, long-term outdoor weatherability at a structure that is easier to manufacture than is currently available in the art to the knowledge of the present inventors. The present invention provides one answer to that need.

SUMMARY OF THE INVENTION

In accordance with one aspect of the invention, there is provided a primer composition comprising (1) an inorganic UV absorbing agent; and (2) a polymer selected from (i) a copolycarbonate comprising repeating units A and B, and (ii) a polyurethane obtained by reaction of a polyisocyanate and a copolycarbonate diol comprising repeating units A and B, wherein repeating units A and B are represented by the following formulae:

wherein the molar ratio of units (A) to units (B) is in the range of from about 9:1 to about 1:9, and wherein $R_1$ is a divalent C8 to C12 alicyclic group, $R_2$ is a divalent group selected from the group consisting of ethylene and propylene, n is an integer ranging from 4 to 40.

In one embodiment, the inorganic absorbing agent is selected from the group consisting of CeOx, TiOx, ZnOx, ZrOx, and combinations thereof, wherein x is 1-2.

The primer composition is effective in holding a significant amount, on the order of 1 to 80% by weight based on the total weight of the primer composition, of inorganic absorbing agents. It is also suitable for promoting the adhesion between a substrate and an abrasion layer such as a thermal/UV cured organic-based topcoat or a hydrogenated silicon oxycarbide layer.

In accordance with another aspect of the invention, there is provided a coated article including a polymeric substrate, a primer layer disposed on at least one surface of the substrate, and an abrasion-resistant layer disposed on the primer layer, wherein the primer layer is made from the primer composition specified above. The abrasion-resistant layer can be an organic-based topcoat or a hydrogenated silicon oxycarbide coating.

In accordance with yet another aspect of the invention there is provided a method for providing a polymeric substrate with a weather and abrasion-resistant coating system. The method includes the steps of: (i) applying the primer composition of the invention onto a polymeric substrate; (ii) curing the primer composition to provide a primer layer; (iii) disposing an abrasion-resistant layer onto the primer layer thereby making a polymeric substrate with a weather and abrasion-resistant coating.

DETAILED DESCRIPTION

In one embodiment of the invention, there is provided a primer composition suitable for providing adhesion of an abrasion-resistant layer to a substrate. The abrasion-resistant layer can be a thermal/UV cured organic-based topcoat or a hydrogenated silicon oxycarbide layer.

The primer composition of the invention contains (1) at least one inorganic absorbing agent, and (2) a polymer selected from (i) a copolycarbonate, and (ii) a polyurethane derived from a copolycarbonate diol. The polymer severs as a matrix to hold the inorganic absorbing agent.

The inorganic absorbing agent is not particularly limited. Suitable examples include, but are not limited to, CeOx, TiOx, ZnOx, ZrOx and mixture of these metal oxides, where x is 1-2. In one embodiment, the inorganic absorbing agent is $CeO_2$.

The polymer suitable for the primer composition of the invention can be either (i) a copolycarbonate comprising repeating units A and B, and (ii) a polyurethane obtained by reaction of a polyisocyanate and a copolycarbonate diol comprising repeating units A and B, wherein repeating units A and B are represented by the following formulae:

and wherein $R_1$ is a divalent C8 to C12 alicyclic group, $R_2$ is a divalent group selected from the group consisting of ethylene and propylene, n is an integer ranging from 4 to 40. In one embodiment, repeating units (A) and (B) are present at a molar ratio ranging from about 1:9 to about 9:1, preferably, from about 1:3 to about 3:1, more preferably at a ratio of about 1:1.

As used herein, an alicyclic group is a non-aromatic group or unit. Preferably an alicyclic group is a non-aromatic carbocyclic or heterocyclic group and represents for example ring systems having from 6 to 10 carbon atoms. Exemplary divalent alicyclic group suitable for use as $R_1$ in repeating unit A is In connection with polymer (i), the molecular weight of the copolycarbonate is from about 500 to about 10 K, preferably from about 1 to about 2 K with respect to polystyrene standard. Without being bound by any theory, it is hypothesized that the alicyclic portion of the copolycarbonate, brings in good film forming properties and the polyether portion helps to achieve aqueous/alcohol solubility. The oligomeric nature of these copolycarbonates (Mn~1-2 K) also favors both film forming and solubility requirements for primer compositions.

The copolycarbonate of the invention contains terminal groups. Each terminal group is a member selected from the group consisting of a hydroxyl group, and a substituted silyl group of the formula:

(Formula I)

wherein $R^1$ is a monovalent hydrocarbon residue having 1 to 10 carbon atoms, preferably, from 1 to 3 carbon atoms, each Y is independently a member selected from the group consisting of a halogen atom, an alkoxy group having 1 to 10 carbon atoms, preferably from 1 to 3 carbon atoms, and an acyloxy group having 1 to 10 carbon atoms, preferably from 1 to 3 carbon atoms, and a is a number having a value of from 1 to 3. In a preferred embodiment, a is 3 and Y is an alkoxy group, preferably a methoxy or a ethoxy group.

The copolycarbonate having hydroxyl groups at its terminals are diols and representative examples of such copolycarbonate diols are represented by the formula:

wherein $R_1$, $R_2$ and n are as defined above, and wherein x and y are chosen in such a way that the molar ratio of x:y is between from about 1:9 to about 9:1 and the molecular weight of the copolycarbonate diol is from about 500 to about 10 K, preferably from about 1 to about 2 K with respect to polystyrene standard.

The copolycarbonate diols of the invention can be prepared by the condensation reaction of an alicyclic diol and a polyether with ethylene carbonate as the carbonate source, or other methods that are known to those skilled in the art. Suitable alicyclic diols include, but are not limited to, cyclohexanedimethanol (CHDM) and tricyclodecanedimethanol (TCDDM). Suitable polyethers include polypropylene glycol (PPG) and polyethylene glycol (PEG). Preferably, the polyether has a molecular weight of from about 300 to about 3000. An exemplary reaction scheme illustrating the synthesis of CHDM and $PPG_{425}$ copolycarbonate is presented below:

Scheme 1

The copolycarbonate diols of the invention can be further silylated, either fully or partially. Silylation of the hydroxyl-terminated copolycarbonates can be accomplished by reacting the copolycarbonate diol with an isocyanatosilane. Suitable isocyanatosilanes are those of the general formula:

wherein $R_3$ is a divalent alkylene group of from 1 to 10, preferably from 1 to 3 carbon atoms, $R^1$ is a monovalent hydrocarbon residue having 1 to 10, preferably from 1 to 3 carbon atoms, each Y is independently a member selected from the group consisting of a halogen atom, an alkoxy group having 1 to 10, preferably 1 to 3 carbon atoms, an acyloxy group having 1 to 10, preferably 1 to 3 carbon atoms, and a is a number having a value of from 1 to 3. In a preferred embodiment, a is 3 and Y is an alkoxy group, preferably a methoxy or a ethoxy group. In one embodiment, $R_3$ is a divalent propyl group.

Examples of such isocyanatosilane for use in the silylation procedure are α-isocyanatomethyltrimethoxysilane, β-isocyanatoethyltrimethoxysilane, γ-isocyanatopropyltrimethoxysilane, α-isocyanatomethyltriethoxysilane, β-isocyanatoethyltriethoxysilane, and γ-isocyanatopropyltriethoxysilane.

In one embodiment, the silylation of the hydroxyl-terminated copolycarbonates herein can be substantially complete, i.e., essentially no hydroxyl groups will be present following silylation. In another embodiment, silylation will be incomplete, or partial. In the case of incomplete silylation, levels of silylation of not more than about 95 molar percent, and advantageously, not more than 90 molar percent, of the total hydroxyl groups present in the copolycarbonate is generally suitable and can be achieved by appropriate adjustment of the amounts of isocyanatosilane being reacted for a given hydroxyl-terminated copolycarbonate.

In connection with polymer (ii), the polyurethanes suitable for use in the primer composition of the invention are derived from the reaction of at least one copolycarbonate diol as specified above in the context of one embodiment of polymer (i) with at least one polyisocyanate.

The isocyanates used to prepare polyurethanes of the invention are organic isocyanates and include any of the known and conventional organic polyisocyanates, especially organic diisocyanates. Preferably, the polyisocyanate is a diisocyanate represented by the formula OCN—$R_4$—NCO, wherein $R_4$ is selected from The polyurethane suitable for use in the primer composition of the invention may be prepared by mixing the hydroxy-terminated polymer and organic isocyanate together at ambient temperature and pressure, although the rate of the reaction is significantly increased if the temperature of the reaction mixture is raised to a higher temperature, for example, a temperature between 60-100° C. and/or in the presence of organo-metallic catalysts such as tin based catalysts (dibutyltin dilaurate (DBTDL)).

The polyurethane may be hydroxyl-terminated or isocyanate-terminated. A molar ratio of NCO to OH from about 1.1 to about 4.0, depending on the selection of the particular copolycarbonate diol, is used to provide isocyanate-terminated polyurethane prepolymers. A molar ratio of NCO to OH from about 0.3 to about 0.95, and more preferably from about 0.5 to about 0.9, depending on the specific copolycarbonate diol, is used to provide hydroxyl group-terminated polyurethane prepolymers. Preferably, the polyurethane is hydroxy-terminated.

Silylation of the isocyanate-terminated polyurethane described herein can be accomplished by reacting the polyurethane with a silane possessing at least one hydrolyzable group and at least one functionality which is reactive for isocyanate, i.e., an active hydrogen-containing group such as hydroxyl, carboxylic acid, mercapto, primary amino or secondary amino. Advantageously, the silane is a primary or secondary aminosilane of the general formula:

wherein $R_6$ is hydrogen or an alkyl group of from 1 to 10 carbon atoms, $R_7$ is a divalent alkylene group of from 1 to 10 carbon atoms, $R^2$ and $R^3$ each independently is an alkyl group of from 1 to 6 carbon atoms or an aryl group of from 6 to 8 carbon atoms, and b has a value of 0, 1 or 2. Preferably, b is 0, $R_7$ is a divalent alkylene group of 1 to 3 carbon atoms, $R^3$ is an alkyl group of from 1 to 3 carbon atoms.

Examples of aminosilanes for use in the silylation procedure herein are 3-aminopropyltrimethoxysilane, 3-aminopropyltriethoxysilane, 4-amino-3,3-dimethylbutyltrimethoxysilane, 4-amino-3,3-dimethylbutyldimethoxymethylsilane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3 amino-2-methylpropyltriethoxy silane, N-ethyl-3-amino-2-methylpropylmethyldimethoxysilane, N-butyl-3-amino-2-methylpropyltrimethoxysilane, N-ethyl-4-amino-3,3-dimethylbutyldimethoxymethylsilane and N-ethyl-4-amino-3,3-dimethylbutyltrimethoxysilane, and the like.

Silylation of the hydroxyl-terminated polyurethane described herein can be accomplished by reacting the polyurethane with an isocyanatosilane. Suitable isocyanatosilanes are those of the general formula:

wherein $R_8$ is a divalent alkylene group of from 1 to 10, preferably 1 to 5 carbon atoms, $R^4$ and $R^5$, each independently is an alkyl group of from 1 to 6 carbon atoms or an aryl group of from 6 to 8 carbon atoms, and c has a value of 0, 1 or 2. Preferably, c is zero, $R^5$ is a C1-C5, preferably C1 to C3 alkyl group, $R_8$ is a divalent alkylene group having from 1 to 3 carbon atoms.

As in the case of the silylated copolycarbonate diol described above, the silylation of the hydroxy-terminated or isocyanate-terminated polyurethane prepolymers herein can be partially or substantially complete, i.e., essentially no hydroxyl and/or isocyanate groups will be present following silylation.

Typically, in addition to the inorganic UV absorbing agent and the copolycarbonate polymer or polyurethane polymer describe above, the primer composition of the invention includes a solvent. The solvent is not particularly limited. Exemplary solvent includes alcohols, such as methanol, ethanol, propanol, isopropanol, n-butanol, tert-butanol, methoxypropanol, ethylene glycol, diethylene glycol butyl ether, or combinations thereof. Other water miscible organic solvents such as acetone, methyl ethyl ketone, ethylene glycol monopropyl ether, and 2-butoxy ethanol, can also be utilized. Typically, these solvents are used in combination with water. In one embodiment, the solvent used is diacetone alcohol.

The primer composition of the invention can also include other additives such as hindered amine light stabilizers, antioxidants, dyes, flow modifiers, and leveling agents. Polyether-polysiloxane copolymers such as BYK®TM-331 manufactured by BYK®-Chemie are commonly added as a flow modifier/leveling agent.

The primer composition of this invention can be prepared by simply mixing the inorganic UV-absorbing agent and the polycarbonate copolymer (i) or polyurethane polymer (ii) and the optional ingredients in a solvent. The order of mixing of the components is not critical. The mixing can be achieved through any means known to a person skilled in the art, for example, milling, blending, stirring, and the like. The primer compositions with varying loading of inorganic UV absorbing agents such as $CeO_2$ are found to be stable for several months or greater than 1 year.

The primer compositions of the invention can be suitably coated onto a polymeric substrate such as a plastic surface. Examples of such plastics include synthetic organic polymeric materials, such as acrylic polymers, for example, poly (methylmethacrylate), and the like; polyesters, for example, poly(ethylene terephthalate), poly(butylene terephthalate), and the like; polyamides, polyimides, acrylonitrile-styrene copolymer, styrene-acrylonitrile-butadiene terpolymers, polyvinyl chloride, polyethylene, and the like, polycarbonates, and copolycarbonates such as EXL, high-heat polycarbonates.

The preferred substrate is formed of polycarbonate or an acrylic resin. Polycarbonates are especially preferred materials for transparent substrates because of their excellent physical, mechanical and chemical properties. In general, the choice of substrate is ultimately determined by the contemplated end use.

Once the primer composition of the invention is coated on a substrate by flow coat, dip coat, spin coat or any other methods known to a person skilled in the field, it is allowed to dry by removal of any solvents, for example by evaporation, thereby leaving a dry coating. The primer composition can subsequently be cured to provide a primer layer.

Through a set of planned experimentation, it has been observed that the primer layer with inorganic absorbing agents such as metal oxide nanoparticles (specifically $CeO_2$) loading of 1-80 wt % in dry film can be made. It is believed that other types of metal oxide nanoparticles can be made at a loading of 1-80 wt % in dry film as well.

The primer layer formed from the primer composition of the invention is effective in providing adhesion of an abrasion layer to a substrate and can be used as part of a coated article of the invention. Thus in accordance with another embodiment of the invention, there is provided a coated article including a polymeric substrate, a primer layer disposed on at least one surface of said substrate, and an abrasion-resistant layer disposed on said primer layer, wherein said primer layer is made from any of the primer composition of the invention disclosed herein.

Figure 1:
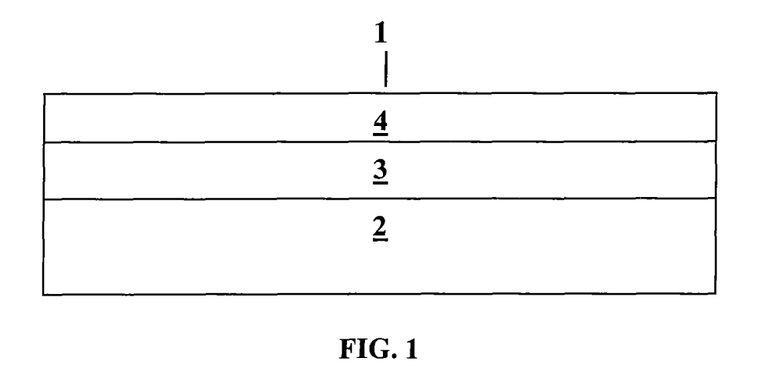
FIG. 1 is a diagrammatic illustration of a coated article according to one embodiment of the invention.
Figure 2:
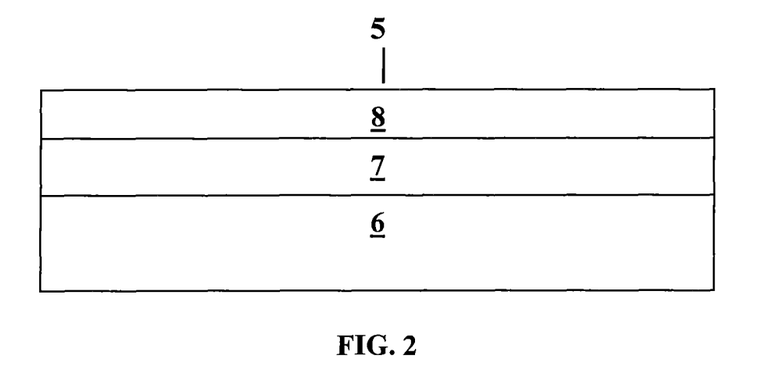
FIG. 2 is a diagrammatic illustration of a coated article according to another embodiment of the invention.

FIGS. 1 and 2 depict illustrative, non-limiting examples of coated articles according to different embodiments of the invention. Referring to FIG. 1, coated article 1 includes substrate 2, primer layer 3 disposed on a surface of substrate 2, and organic-based topcoat 4 disposed on primer layer 3.

The topcoat is formed by first applying a coating composition onto the primer layer, followed by curing the composition. The topcoat composition is not particularly limited. Silicone hardcoats comprised of a siloxanol resin/colloidal silica dispersions are one example of a coating composition that may be used as a topcoat. The topcoat may contain additional organic UV-absorbing agents if desired, but the loading can be lower than those that do not have inorganic absorbing agent in either the primer layer or the hardcoat layer. Thus the abrasion integrity is maintained and in some cases improved by limiting the amount of organic UV-absorbing agent, while at the same time, the weatherability is improved.

Siloxanol resin/colloidal silica dispersions are known in the art. Generally, these compositions have a dispersion of colloidal silica in an aliphatic alcohol/water solution of the partial condensate of an alkyltrialkoxysilane, which can be methyltrimethoxysilane. Aqueous colloidal silica dispersions generally have a particle size in the range of 5 to 150 millimicrons in diameter. These silica dispersions are prepared by methods well-known in the art and are commercially available. Depending upon the percent solids desired in the final coating composition, additional alcohol, water, or a water-miscible solvent can be added. Generally, the solvent system should contain from about 20 to about 75 weight percent alcohol to ensure solubility of the siloxanol formed by the condensation of the silanol. If desired, a minor amount of an additional water-miscible polar solvent such as acetone, butyl cellosolve, and the like can be added to the water-alcohol solvent system. The composition is allowed to age for a short period of time to ensure formation of the partial condensate of the silanol, i.e., the siloxanol. Examples of aqueous/organic solvent borne siloxanol resin/colloidal silica dispersions can be found in U.S. Pat. No. 3,986,997 to Clark which describes acidic dispersions of colloidal silica and hydroxylated silsesquioxane in an alcohol-water medium with a pH of about 3-6. Also, U.S. Pat. No. 4,177,315 to Ubersax discloses a coating composition comprising from about 5 to 50 weight percent solids comprising from about 10 to 70 weight percent silica and about 90 to 30 weight percent of a partially polymerized organic silanol of the general formula $RSi(OH)_3$, wherein R is selected from methyl and up to about 40% of a radical selected from the group consisting of vinyl, phenyl, gamma-glycidoxypropyl, and gamma-methacryloxypropyl, and about from 95 to 50 weight percent solvent, the solvent comprising about from 10 to 90 weight percent water and about from 90 to 10 weight percent lower aliphatic alcohol, the coating composition having a pH of greater than about 6.2 and less than about 6.5. U.S. Pat. No. 4,476,281 to Vaughn describes hardcoat composition having a pH from 7.1-7.8. In another example, U.S. Pat. No. 4,239,798 to Olson et al. discloses a thermoset, silica-filled, organopolysiloxane top coat, which is the condensation product of a silanol of the formula $RSi(OH)_3$ in which R is selected from the group consisting of alkyl radicals of 1 to 3 carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$. The content of the foregoing patents are herein incorporated by reference.

The siloxanol resin/colloidal silica dispersions described herein above can contain partial condensates of both organo-trialkoxysilanes and diorganodialkoxysilanes; and can be prepared with suitable organic solvents, such as, for example, 1 to 4 carbon alkanol, such as methanol, ethanol, propanol, isopropanol, butanol; glycols and glycol ethers, such as propyleneglycolmethyl ether and the like and mixtures thereof.

UV absorbers can be employed at levels from about 2 to about 20 weight percent of the total composition. Suitable UV absorbers are those which co-react with partial hydolyzate and are less likely to volatilize during the heat cure. Exemplary UV absorbers include 4[gamma-(trimethoxysilyppropoxy]-2-hydroxybenzophenone, 4 [gamma-(triethoxysilyl) propoxy]-2-hydroxybenzophenone, 2-[(triethoxysilyppropyl]dibenzylresorcinol, hydroxy benzophenone and benzotriazole serves as well as the triazine, cyanoacrylates and benzylidene malonates or their mixtures.

Other additives such as hindered amine light stabilizers, antioxidants, dyes, flow modifiers and leveling agents or surface lubricants can be used. Other colloidal metal oxides can be present at up to about 10% by weight of the aqueous/organic solvent borne siloxanol resin/colloidal silica dispersion and can include metal oxides such as, antimony oxide, cerium oxide, aluminum oxide, zinc oxide, and titanium dioxide.

The commercial coating products AS4000™, AS4700™, SHC2050™ (Momentive Performance Materials), SIL-VUE™ 121, SILVUE™ 339, SILVUE™ MP100 (SDC Technologies), and HI-GARD™ 1080 (PPG) are all examples of coatings based on siloxanol resin/colloidal silica dispersions.

Referring to FIG. 2, coated article 5 includes a substrate 6, a primer layer 7 deposited on a surface of substrate 6, and a hydrogenated silicon oxycarbide layer 8 deposited on primer layer 7.

The hydrogenated silicon oxycarbide layer can be deposited on the primer layer via physical vapor deposition or plasma deposition techniques. Exemplary techniques include but are not limited to plasma enhanced chemical vapor deposition, expanding thermal plasma, microwave plasma, inductively coupled plasma, and high density plasma chemical vapor deposition. The hydrogenated silicon oxycarbide layer may also be deposited onto the primer layer by one of sputtering, laser ablation, cathodic arc deposition, and electron beam evaporation.

If desired, an organic-based topcoat can be deposited on the hydrogenated silicon oxycarbide layer to provide additional abrasion resistance and weatherability to the polymeric substrate.

The following examples are illustrative and not to be construed as limiting of the invention as disclosed and claimed herein. All parts and percentages are by weight and all temperatures are degrees Celsius unless explicitly stated otherwise. All patent applications, patents and other publications cited herein are incorporated by reference in their entirety.

EXAMPLES

Example 1

CHDM-PPG coPC-CeO$_2$ Based Primer Compositions

Part A Preparation of CHDM-PPG coPC

General procedure: Cyclohexanedimethanol (CHDM), polypropylene glycol (PPG-425) and ethylene carbonate in a molar ratio of 1:1:3 were charged to a three-neck round bottom flask equipped with a stirrer, and a distillation set up connected to a vacuum pump. To the flask, was added 0.5 mol % of anhydrous sodium acetate. The reaction mixture was heated to a temperature of 140° C. under atmospheric pressure for 30 minutes. Subsequently, vacuum was applied progressively (till 5 mbar) to remove the by-product (ethylene glycol) while simultaneous raising the temperature to 210° C. during a period of five hours. After the reaction was completed, the residual were removed from the reaction mixture by exposing it to high vacuum to provide the desired product, CHDM-PPG copolycarbonate diol.

Part B Preparation of Primer Compositions Containing CHDM-PPG coPC and $CeO_2$

General Procedure: A mixture of CHDM-PPG coPC and diacetone alcohol in a round bottom flask was stirred at room temperature for 5 minutes. Subsequently, 1-methoxy-2-propanol was added while stirring at room temperature. To the above solution, aqueous cerium oxide (20 wt %) was slowly added over a period of 5 minutes at room temperature. The stirring was continued for 30 minutes at the same temperature. Finally, BYK®-331 was added to above mixture and stirred for 30 minutes at room temperature. A primer composition was obtained as yellow clear liquid (pH, 4-4.4).

In accordance of the general procedure, primer compositions 1-4 with varying loading of CHDM-PPG coPC and cerium oxide were prepared and shown below in Tables 1-4. These compositions were found to be suitable to use as a primer, as a visually uniform layer was resulted when applied onto the polycarbonate substrate and dried. Similar results were observed when screened CHDM-PPG coPC with Mn~2K.

TABLE 1

Primer Composition 1

| Component | Qty in g | Wt % | Non-volatile | wt % in dry film |
|---|---|---|---|---|
| CHDM-PPG (Mn~1.2k) | 1 | 1.6667 | 1.6667 | 33.3297 |
| Diacetone alcohol (DA) | 24.5 | 40.8329 | | |
| 1-methoxy-2-propanol (MP) | 24.5 | 40.8329 | | |
| 20 wt % aq CeO2 - 10 g | | | | |
| CeO2 content | 2 | 3.3333 | 3.333 | 66.6513 |
| Water content | 8 | 13.3332 | | |
| BYK ®-331 | 0.0006 | 0.00095 | 0.00095 | 0.019 |
| | 60.001 | 100 | 5.00065 | 100 |

TABLE 2

Primer Composition 2

| Component | Qty in g | Wt % | Non-volatile | wt % in dry film |
|---|---|---|---|---|
| CHDM-PPG (Mn~1.2k) | 1 | 1.8517 | 1.8517 | 55.4385 |
| Diacetone alcohol (DA) | 24.5 | 45.37 | | |
| 1-methoxy-2-propanol (MP) | 24.5 | 45.37 | | |
| 20 wt % aq CeO2 - 10 g | | | | |
| CeO2 content | 0.8 | 1.4814 | 1.4814 | 44.352 |
| Water content | 3.2 | 5.9255 | | |
| BYK ®-331 | 0.004 | 0.007 | 0.007 | 0.21 |
| | 54.004 | 100.01 | 3.3401 | 100.001 |

TABLE 3

Primer Composition 3

| Component | Qty in g | Wt % | Non-volatile | wt % in dry film |
|---|---|---|---|---|
| CHDM-PPG (Mn~1.2k) | 2 | 3.704 | 3.704 | 71.3337 |
| Diacetone alcohol (DA) | 24 | 44.444 | | |
| 1-methoxy-2-propanol (MP) | 24 | 44.444 | | |
| 20 wt % aq CeO2 - 10 g | | | | |
| CeO2 content | 0.8 | 1.4815 | 1.4815 | 28.5315 |
| Water content | 3.2 | 5.9259 | | |
| BYK ®-331 | 0.004 | 0.0074 | 0.007 | 0.1348 |
| | 54 | 100.07 | 5.1925 | 100 |

TABLE 4

Primer Composition 4

| Component | Qty in g | Wt % | Non-volatile | wt % in dry film |
|---|---|---|---|---|
| CHDM-PPG (Mn~1.2k) | 2 | 3.3333 | 3.3333 | 49.9951 |
| Diacetone alcohol (DA) | 24 | 39.9996 | | |
| 1-methoxy-2-propanol (MP) | 24 | 39.9996 | | |
| 20 wt % aq CeO2 - 10 g | | | | |
| CeO2 content | 2 | 3.3333 | 3.333 | 49.9991 |
| Water content | 8 | 13.3332 | | |
| BYK ®-331 | 0.00057 | 0.00095 | 0.00095 | 0.01425 |
| | 60.0006 | 99.99995 | 6.66725 | 100.008 |

Example 2

CHDM-PEG coPC-$CeO_2$ Based Primer Compositions

Similar to example 1, instead of CHDM-PPG coPC, CHDM-PEG coPC was prepared and used in the primer composition. As used herein, PEG stands for polyethylene glycol.

Example 3

TCDDM-PPG coPC-$CeO_2$ Based Primer Compositions

Similar to example 1, instead of CHDM-PPG coPC, TCDDM-PPG coPC was prepared and used in the primer composition. As used herein, TCDDM stands for tricyclodecanedimethanol.

Example 4

TCDDM-PEG coPC-$CeO_2$ Based Primer Compositions

Similar to example 1, instead of CHDM-PPG coPC, TCDDM-PEG coPC was prepared and used in the primer composition

Example 5

Mixture of CHDM-PPG coPC and TCDDM-PPG coPC-CeO$_2$ Based Primer Compositions Similar to example 1, instead of CHDM-PPG coPC, a 1:1 mixture of CHDM-PPG coPC and TCDDM-PPG coPC was prepared and used in the primer composition.

Example 6

Silylated-CHDM-PPG coPC-CeO$_2$ Based Primer Compositions

Part A Preparation of Silylated-CHDM-PPG coPC

General procedure: The reaction can be performed without solvent. Copolycarbonate diol and 3-isocyanatopropyltrimethoxysilane in a 1:2 molar ratio were charged into a round bottom flask. To the above mixture, was added catalytic amount of dibutyltin dilaurate catalyst (10-50 ppm). The reaction mixture was heated to 80-85° C. with stirring. The reaction was monitored by FTIR spectra for the disappearance of —NCO peak. Upon the completion of the reaction (2-5 hours), the reaction mixture was cooled to room temperature. In cases where the reactions were conducted in a solvent (toluene/DMF), the solvent was removed from the reaction mixture by vacuum.

Part B Preparation of Primer Compositions

Similar to example 1, instead of CHDM-PPG coPC, silylated-CHDM-PPG coPC was used in the primer composition.

Example 7

Silylated-TCDDM-PPG coPC-CeO$_2$ Based Primer Compositions

Similar to example 6, instead of silylated-CHDM-PPG coPC, fully silylated-TCDDM-PPG coPC was prepared and used in the primer composition.

Example 8

Mixture of Silylated-CHDM-PPG coPC and Silylated-TCDDM-PPG coPC-CeO$_2$ Based Primer Compositions Similar to working example 1, instead of CHDM-PPG coPC, a mixture of fully silylated-CHDM-PPG coPC and fully silylatd-TCDDM-PPG coPC was used in the primer composition.

Comparative Example A

PMMA/CeO$_2$ Based Primer Compositions

A mixture of poly(methylmethacrylate) ("PMMA") and diacetone alcohol in a round bottom flask was stirred at room temperature for 5 minutes. Subsequently, 1-methoxy-2-propanol was added while stirring at room temperature. To the above solution, aqueous cerium oxide (20 wt %) was slowly added over a period of 5 minutes at room temperature. PMMA was precipitated as soon as aqueous CeO$_2$ was added. This shows that PMMA/CeO$_2$ dispersion is not suitable to use as a primer composition.

TABLE 5

Primer Composition 5

| Component | Qty in g | Wt % | Non-volatile | wt % in dry film |
|---|---|---|---|---|
| PMMA | 1 | 1.6667 | 1.6667 | 33.3297 |
| Diacetone alcohol (DA) | 24.5 | 40.8329 | | |
| 1-methoxy-2-propanol (MP) | 24.5 | 40.8329 | | |
| 20 wt % aq CeO2 - 10 g | | | | |
| CeO2 content | 2 | 3.3333 | 3.333 | 66.6513 |
| Water content | 8 | 13.3332 | | |
| BYK ®-331 | 0.0006 | 0.00095 | 0.00095 | 0.019 |
| | 60.001 | 100 | 5.00065 | 100 |

Comparative Example B

PPG/CeO$_2$ Based Primer Compositions

A mixture of polypropylene glycol (PPG) with Mn ~425 and diacetone alcohol in a round bottom flask was stirred at room temperature for 5 minutes. Subsequently, 1-methoxy-2-propanol was added while stirring at room temperature. To above solution, aqueous cerium oxide (20 wt %) was slowly added over a period of 5 minutes at room temperature. The stirring was continued for 30 minutes at the same temperature. Finally, BYK®-331 was added to above mixture and stirred for 30 minutes at room temperature. The primer composition was obtained as a yellow clear liquid (pH, 4-4.4). This resulting composition was found to be not suitable to use as a primer, as a visually un-uniform layer was resulted when applied onto the polycarbonate substrate and dried.

TABLE 6

Primer Composition 6

| Component | Qty in g | Wt % | Non-volatile | wt % in dry film |
|---|---|---|---|---|
| PPG (Mn 425) | 1 | 1.6667 | 1.6667 | 33.3297 |
| Diacetone alcohol (DA) | 24.5 | 40.8329 | | |
| 1-methoxy-2-propanol (MP) | 24.5 | 40.8329 | | |
| 20 wt % aq CeO2 - 10 g | | | | |
| CeO2 content | 2 | 3.3333 | 3.333 | 66.6513 |
| Water content | 8 | 13.3332 | | |
| BYK ®-331 | 0.0006 | 0.00095 | 0.00095 | 0.019 |
| | 60.001 | 100 | 5.00065 | 100 |

Comparative Example C

PPG/CeO$_2$ Based Primer Compositions

Similar to comparative example B, except that PPG of higher molecular weights (Mn ~1000, 2000 & 8000) were used, instead of PPG with Mn ~425. The resulting compositions were found to be not suitable to use as a primer, as a visually un-uniform layer was resulted when applied onto the polycarbonate substrate and dried.

Comparative Example D

PEG/CeO$_2$ Based Primer Compositions

Similar to comparative example B, except that PEG with Mn~300 was used, instead of PPG with Mn~425. This resulting composition was found to be not suitable to use as a primer, as a visually un-uniform layer was resulted when applied onto the polycarbonate substrate and dried.

Comparative Example E

CHDM Homopolymer/CeO$_2$ Based Primer Compositions

A mixture of CHDM homopolymer and diacetone alcohol in a round bottom flask was stirred at room temperature for 5 minutes. Subsequently, 1-methoxy-2-propanol was added while stirring at room temperature. To the above solution, aqueous cerium oxide (20 wt %) was slowly added over a period of 5 minutes at room temperature. CHDM homopolymer was precipitated as soon as aqueous CeO$_2$ was added. This shows that CHDM homopolymer/CeO$_2$ dispersion is not suitable to use as a primer.

Proposed Example 1

Polyurethane of CHDM-PPG coPC-CeO2 Based Primer Compositions

Part A Preparation of Polyurethane Derived From CHDM-PPG coPC

General procedure: Hydroxyl terminated or NCO terminated polyurethane pre-polymers were synthesized by chain extension of hydroxyl terminated copolycarboante diol with diisocyanate. Depending on the ratio of NCO/OH, isocyanato or hydroxyl terminated polyurethanes were made. The reaction can be performed both with and without solvent. In cases where the reactions were conducted in a solvent (toluene/DMF), the solvent was removed from the reaction mixture under the vacuum at the completion of the reaction.

Part B Preparation of the Primer Composition

Similar to example 1, instead of CHDM-PPG coPC, polyurethane of CHDM-PPG coPC is used in the primer composition.

Proposed Example 2

Silylated Polyurethane of CHDM-PPG coPC-CeO2 Based Primer Compositions

Part A Preparation of Silylated Polyurethane Derived From CHDM-PPG coPC

Polyurethane prepared from proposed example 1 above and 3-isocyanatopropyltrimethoxy silane in a molar ratio of 1:2 were charged into a round-bottom flask. To the mixture was added 10 to 20 ppm of dibutyltin dilaurate. The reaction was heated to 80 to 85° C. with stirring. The reaction was monitored by FTIR spectra, for the disappearance of —NCO peak. Upon completion of the reaction after 2 to 5 hours, the reaction mixture was cooled down to room temperature to produce the desired product.

Part B Preparation of the Primer Composition

Similar to example 1, instead of CHDM-PPG coPC, silylated polyurethane of CHDM-PPG coPC is used in the primer composition.

Example 9

Coating Examples 1, 2 and Comparative Coating Example A

Part A Preparation of Silicone Hardcoat Comprised of a Siloxanol Resin/Colloidal Silica Dispersion To a 3 L Eyrlenmeyer flask was charged 704.3 g of methyltrimethoxysilane and 16.75 g of acetic acid. A magnetic stirring bar was added and the flask was then chilled in an ice bath while stirring by magnetic stirrer. Once the mixture in the flask reached a temperature of <10° C., a mixture of 283.2 g of AS40 Colloidal Silica (Grace Davidson) and 250.4 g of deionized water was added over 20-30 minutes while stirring. Care was taken not to allow the temperature of the reaction mixture to increase to >35° C. during the addition of colloidal silica/water mixture. After the addition was complete, the mixture was allowed to stir for ~16 hours while the ice bath melted and the dispersion warmed to room temperature. The reaction mixture, now a hazy suspension, was then diluted with 330.5 g of iso-propanol, 326.3 g of n-butanol, and 37.45 g of acetic acid. The reaction mixture was again allowed to stand for >24 hours, then 2.06 g of tetrabutylammonium acetate solution and 0.37 g of BYK®302 (BYK®-Chemie) were added to provide a coating composition. This coating composition was then allowed to age at room temperature for >4 weeks prior to application on a primed substrate.

Part B Coating of Polycarbonates

Primer composition 1 described in example 1 was coated onto a polycarbonate substrate. The solvent was subsequently evaporated; and the primer composition was cured to provide a primer layer.

The silicone topcoat prepared at Part A, example 9 or AS4700 were subsequently coated onto the primer layer and thermally cured to provide coating examples 1 and 2.

For comparative purposes, the silicone hardcoat assembly containing SHP470 as a primer and AS4700 as a topcoat were prepared to provide comparative coating example A. The specific combinations of primer and topcoat examples tested are given in table 7.

The typical abrasion resistance, adhesion and optical properties observed for the polycarbonate substrate coated with the assembly described in table 7 are given in the table 8.

TABLE 7

| Coating Examples | | |
| --- | --- | --- |
| Coating Example | Primer | Topcoat |
| 1 | Primer composition 1 in Example 1 | Part A Example 9 |
| 2 | Primer composition 1 in Example 1 | AS4700 |
| Comparative A | SHP470 | AS4700 |

TABLE 8

Abrasion resistance, Adhesion and Optical properties for coated polycarbonate substrates

| | | | Taber Abrasion | |
| --- | --- | --- | --- | --- |
| Coating Example | % T | % Haze | ΔH500 cycles | Adhesion |
| 1 | 88.1 | 0.89 | 3.0 | 5B |
| 2 | 88.4 | 0.81 | 3.7 | 5B |
| Comparative A | 90.3 | 0.68 | 6.1 | 5B |

Figure 3:
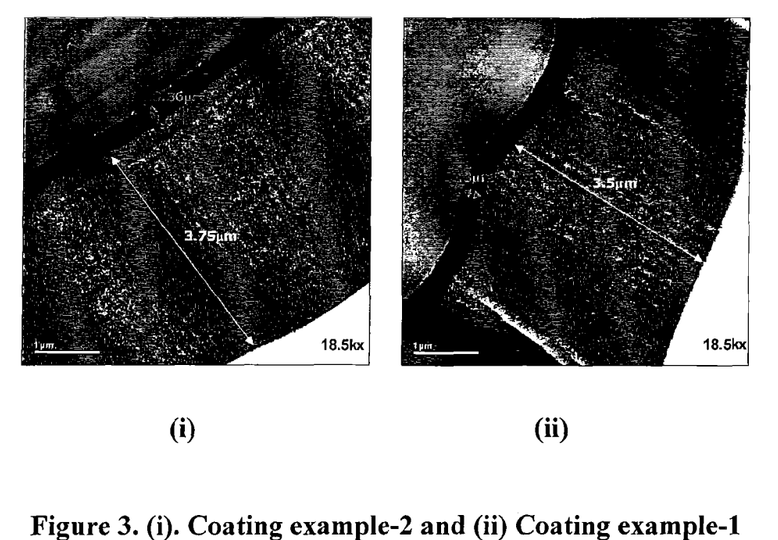
FIG. 3 shows cross-section TEM analysis of an article coated according to the present invention.

As shown in Table 8, Coating Example 2 for PC showed good abrasion resistance, adhesion and optical properties, similar to SHP470/AS4700 coat. Similar properties are observed for Coating Example 1 where the topcoat doesn't contain an organic UV absorber. As inferred from the cross-section TEM analysis as shown in FIG. 3, there are no micro-cracks and delamination at the interfaces (PC/primer/topcoat).

Proposed Example 3

A mixture of 2.0 g of CHDM-PPG coPC (Mn ~1.2 K), 24.00 g diacetone alcohol, and 24.00 g 1-methoxy-2-propanol was mixed at room temperature to provide a solution. To the CHDM-PPG coPC solution was added 2.04 g aqueous cerium oxide (20 wt %). The resultant was stirred to make a homogeneous dispersion. To the dispersion was added 0.004 g of BYK®-331 as a flow/leveling agent to provide a primer composition. The primer composition is a yellow clear liquid (pH 3.5-4.4).

This primer composition is coated onto a polycarbonate substrate. The solvent is removed and the primer composition is cured to provide a primer layer. The silicone topcoat as described in example 9, part A is coated onto the primer layer and thermally cured.

Figure 4:
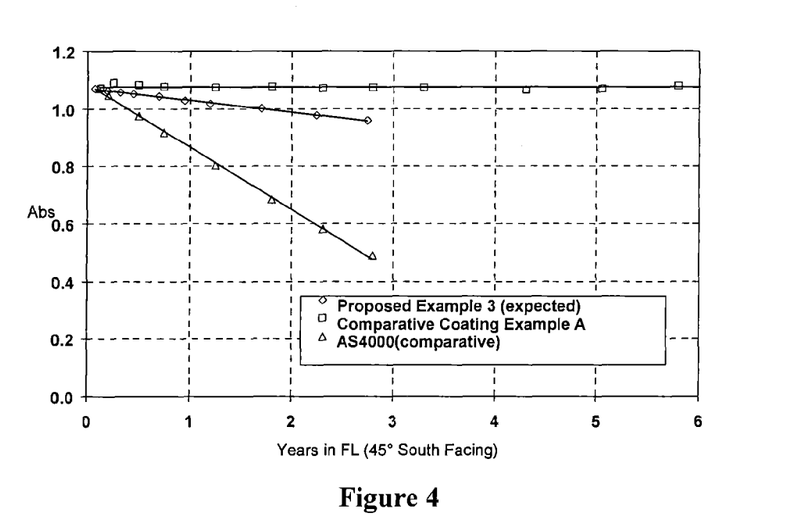
FIG. 4 illustrates the absorbance loss as a function of UV exposure of the UV absorber of the current invention compared to organic prior art UV absorbers.

The absorbance loss on exposure to UV radiation due to the presence of the inorganic UV absorber $CeO_2$ in the silicone hardcoat is shown in FIG. 4. The absorbance loss of coatings containing organic UV absorbers such as that in comparative coating Example A and AS4000 is shown as reference in FIG. 4.

While the invention has been described above with references to specific embodiments thereof, it is apparent that many changes, modifications and variations can be made without departing from the invention concept disclosed herein. Accordingly, it is intended to embrace all such changes, modifications, and variations that fall within the spirit and broad scope of the appended claims.

What is claimed is:

1. A primer coating composition comprising (1) an inorganic UV absorbing agent selected from the group consisting of CeOx, TiOx, ZnOx, ZrOx, and combinations thereof, wherein x is 1-2; and (2) a polymer selected from (i) a linear copolycarbonate comprising repeating units A and B, and (ii) a polyurethane obtained by reaction of a polyisocyanate and a linear copolycarbonate diol comprising repeating units A and B, wherein repeating units A and B are represented by the following formulae:

$$\left[ R_1-O-\underset{O}{\underset{\|}{C}}-O \right]\!\!, \text{ and} \qquad (A)$$

$$\left[ \left( R_2-O \right)_{\!n}\underset{O}{\underset{\|}{C}}-O \right]\!\!, \qquad (B)$$

wherein the molar ratio of units (A) to units (B) is in the range of from about 9:1 to about 1:9, and wherein $R_1$ is a divalent C8 to C12 alicyclic group, $R_2$ is a divalent group selected from the group consisting of ethylene, propylene, and combinations thereof, n is an integer ranging from 4 to 40;

wherein the UV absorbing agent is present in an amount of from about 33 weight percent to about 80 weight percent based on a total dry weight of the primer composition, wherein the primer composition upon drying and curing forms an optically transparent coating.

2. The primer coating composition of claim 1, wherein the copolycarbonate of component (2)(i) comprising terminal groups, wherein each terminal group is a member selected from the group consisting of a hydroxyl group, and a substituted silyl group of the formula

(Formula I)

wherein $R^1$ is a monovalent hydrocarbon residue having 1 to 10 carbon atoms, each Y is independently a member selected from the group consisting of a halogen atom, an alkoxy group having 1 to 10 carbon atoms, an acyloxy group having 1 to 10 carbon atoms, and a is a number having a value of from 1 to 3.

3. The primer coating composition of claim 2 wherein substantially all of the terminal groups of the copolycarbonate of component (2)(i) are silyl groups of Formula (1).

4. The primer coating composition of claim 1 wherein substantially all the terminal groups of the copolycarbonate of component (2)(i) are hydroxyl groups.

5. The primer coating composition of claim 1 wherein each occurrence of $R_1$ is independently 6. The primer coating composition of claim 1 wherein the polyisocyanate is a diisocyanate represented by

OCN—$R_4$—NCO, wherein $R_4$ is selected from

7. The primer coating composition of claim 1 polyurethane is hydroxyl-terminated or isocyanate-terminated.

8. The primer coating composition of claim 7 wherein the polyurethane is silylated with at least one compound selected from the group consisting of aminosilane and isocyanatosilane.

9. The primer coating composition of claim 8 wherein the aminosilane is of the general formula:

wherein $R_6$ is hydrogen or an alkyl group of from about 1 to about 10 carbon atoms, $R_7$ is a divalent alkylene group of from about 1 to about 10 carbon atoms, $R^2$ and $R^3$ each independently is an alkyl group of from about 1 to about 6 carbon atoms or an aryl group of from about 6 to about 8 carbon atoms, and b has a value of 0, 1 or 2; and the isocyanatosilane is of the general formula:

wherein $R_8$ is a divalent alkylene group of from about 1 to about 10 carbon atoms, $R^4$ and $R^5$ each independently is an alkyl group of from about 1 to about 6 carbon atoms or an aryl group of from about 6 to about 8 carbon atoms, and c has a value of 0, 1 or 2.

10. A coated article comprising a polymeric substrate, a primer layer disposed on at least one surface of said substrate, and an abrasion-resistant layer disposed on said primer layer, wherein said primer layer is made from the primer coating composition of claim 1.

11. The coated article of claim 10 wherein said abrasion-resistant layer is an organic-based topcoat.

12. The coated article of claim 10 wherein said abrasion-resistant layer is a silicone hardcoat.

13. The coated article of claim 10 wherein said abrasion-resistant layer is a hydrogenated silicon oxycarbide layer.

14. The coated article of claim 13 wherein the hydrogenated silicon oxycarbide layer is deposited on the primer layer by a method selected from the group consisting of plasma enhanced chemical vapor deposition, expanding thermal plasma, microwave plasma, inductively coupled plasma, high density plasma chemical vapor deposition, and combinations thereof.

15. The coated article of claim 10, wherein said substrate is selected from polycarbonates and copolycarbonates, acrylic polymers, polyesters, polyamides, polyimides, acrylonitrile-styrene copolymer, styrene-acrylonitrile-butadiene terpolymer, polyvinyl chloride, polyethylene, and combinations thereof.

16. A method for providing a polymeric substrate coated with a weather and abrasion-resistant coating system, comprising the steps of:
(i) applying the primer coating composition of claim 1 onto a polymeric substrate;
(ii) curing the primer composition to provide a primer layer; and
(iii) disposing an abrasion-resistant layer onto the primer layer thereby making the polymeric substrate coated with a weather and abrasion-resistant coating system.

17. The method of claim 16 wherein the abrasion-resistant layer is an organic-based topcoat.

18. The method of claim 16 wherein the abrasion-resistant layer is a silicone hardcoat.

19. The method of claim 16 wherein the abrasion-resistant layer is a hydrogenated silicon oxycarbide layer.

20. The method of claim 16 wherein said polymeric substrate is selected from polycarbonates and copolycarbonates, acrylic polymers, polyesters, polyamides, polyimides, acrylonitrile-styrene copolymer, styrene-acrylonitrile-butadiene terpolymer, polyvinyl chloride, polyethylene, and combinations thereof.

* * * * *